(12) United States Patent
Natarajan

(10) Patent No.: US 7,657,607 B2
(45) Date of Patent: Feb. 2, 2010

(54) SYSTEM AND METHOD FOR PASSIVE SERVER-TO-CLIENT DATA DELIVERY

(75) Inventor: Giri Natarajan, La Palma, CA (US)

(73) Assignees: Kabushiki Kaisha Toshiba (JP); Toshiba Tec Kabushiki Kaisha (JP)

( * ) Notice: Subject to any disclaimer, the term of this patent is extended or adjusted under 35 U.S.C. 154(b) by 448 days.

(21) Appl. No.: 11/444,585

(22) Filed: Jun. 1, 2006

(65) Prior Publication Data

US 2007/0282970 A1  Dec. 6, 2007

(51) Int. Cl.
 G06F 15/16  (2006.01)
(52) U.S. Cl. .................. 709/217; 709/230; 709/218; 709/229; 717/168
(58) Field of Classification Search ............. 709/217, 709/218, 219, 229, 230
 See application file for complete search history.

(56) References Cited

U.S. PATENT DOCUMENTS

| | | | | |
|---|---|---|---|---|
| 6,173,328 | B1 * | 1/2001 | Sato | 709/231 |
| 6,775,701 | B1 * | 8/2004 | Pan et al. | 709/226 |
| 2001/0034771 | A1 * | 10/2001 | Hutsch et al. | 709/217 |
| 2003/0028633 | A1 * | 2/2003 | Lindsay et al. | 709/224 |
| 2003/0131048 | A1 * | 7/2003 | Najork | 709/203 |
| 2003/0220835 | A1 * | 11/2003 | Barnes, Jr. | 705/14 |

OTHER PUBLICATIONS www.researchandmarkets.com/.../kiosks_and_print_services_for_consumer.pdf "Kiosk and Print Services for Consumer Digital Photography"—Research and Markets.*
download.microsoft.com/.../WindowsEmbeddedEnterpriseKioskBrochure-FINAL-web.pdf "Kiosk Solutions"—Microsoft.com.*

* cited by examiner

*Primary Examiner*—Ario Etienne
*Assistant Examiner*—Randy Scott
(74) *Attorney, Agent, or Firm*—Tucker Ellis & West LLP

(57) ABSTRACT

A passive server-to-client data delivery system and method is provided. A web service request is received by a server from a client device requesting the performance of a web-based service. The identity of the client device is then ascertained and the server determines that new software is available for the requesting device. The server then performs the requested service and sets a flag indicating the availability of the new software. The response data, including the performed service, is supplemented with the flag data and returned to the client device. The client device, upon receipt of the supplemented response data then initiates a separate update request for the available software, which is then received by the client device and installed.

20 Claims, 5 Drawing Sheets

SYSTEM AND METHOD FOR PASSIVE SERVER-TO-CLIENT DATA DELIVERY

BACKGROUND OF THE INVENTION

The subject application is directed to a system and method for passive server-to-client data delivery. In particular, the subject application is directed to a system and method for transmitting new software, updates, data, or other supplemental information to an associated workstation or other network device in response to a service request submitted by the workstation or network device.

In a typical network, a workstation or other network device will transmit a request for a selected service to be performed by the server or another device on the network. For example, a user may submit a document processing request via a workstation to the network server, wherein such document processing request is transmitted to an associated document rendering device for processing. The document rendering device will then generate a response, via the server, to the workstation as to the status of the request. There is also a periodic need for a workstation to receive updated or supplemental data or executable code. In a typical web-based data communication between a client and a server, a server has no information as to presence or availability of a client until such time as the client initiates a request for services to that server. Earlier systems therefore required that a workstation periodically engage of a check made to the server to determine if there is software or data that should be sent to the workstation. Such periodic checking by a multitude of workstations results in overhead in processing and communication since a workstation must initiate periodic checks to a server to determine whether such program or data is available. Additional overhead is expected when a server responds that a transmission is desired. Once such is identified, a workstation will typically request a transmission from the server, receive the information, and then undertake loading or installation once received. This separate response requires additional processing time and may result in delays in dispatching and installing the upgrade. As such, there is a need for transmitting such software upgrades to a workstation in response to a service request, rather than sending a separate transmission of such upgrade.

The subject application overcomes the aforementioned problems and provides a system and method for transmitting software upgrades or other supplemental data to an associated workstation or other network device in response to a service request submitted by such workstation or network device.

SUMMARY OF THE INVENTION

In accordance with the subject application, there is provided a system and method for passive server-to-client data delivery.

Further, in accordance with the subject application, there is provided a system and method for transmitting new software upgrades or other supplemental information to an associated workstation or other network device in response to a service request submitted by the workstation or network device.

Still further, in accordance with the subject application, there is provided a system and method for transmitting supplemental data in response to service request from an associated workstation or network device.

Still further, in accordance with the subject application, there is provided a passive server-to-client data delivery system. The system includes means adapted for receiving, via an associated network, web service request data representative of at least one selected web service request from an associated workstation. The web service request data includes identification data representative of an identity of the associated workstation. The system also comprises testing means adapted for testing received request data to identify delivery data targeted for the associated workstation. The system further includes means adapted for supplementing response data responsive to received web service request data with identified delivery data targeted for the associated workstation and means adapted for communicating output data, which includes response data and delivery data, to the associated workstation.

Still further, in accordance with the subject application, there is provided passive server-to-client data delivery. The method includes the step of receiving, via an associated network, web service request data representative of at least one selected web service request from an associated workstation, wherein the web service request data includes identification data representative of an identity of the associated workstation. The method then tests the received request data to identify delivery data targeted for the associated workstation. If delivery data is identified, the method supplements response data for the received web service request data with the identified delivery data targeted for the associated workstation. Output data, which includes the response data and the delivery data is then communicated to the associated workstation.

Preferably, the output data includes flag data indicative of a presence of a delivery data included therein.

In one embodiment of the subject application, the system and method include the ability to receive response data and delivery data into the associated workstation and install received delivery data in the associated workstation.

In another embodiment of the subject application, the associated workstation is comprised of a document processing kiosk, and wherein the delivery data includes executable code adapted for operation thereof. Preferably, the associated workstation includes the ability to commence the executable code upon a receipt of flag data. Also, preferably, in the system and method of the subject application, the executable code performs an update of software located on document processing kiosk.

Still other advantages, aspects and features of the subject application will become readily apparent to those skilled in the art from the following description wherein there is shown and described a preferred embodiment of the subject application, simply by way of illustration of one of the best modes best suited to carry out the subject application. As it will be realized, the subject application is capable of other different embodiments and its several details are capable of modifications in various obvious aspects all without departing from the scope of the subject application. Accordingly, the drawing and descriptions will be regarded as illustrative in nature and not as restrictive.

BRIEF DESCRIPTION OF THE DRAWINGS

The subject application is described with reference to certain figures, including.

DETAILED DESCRIPTION OF THE PREFERRED EMBODIMENT

The subject application is directed to system and method for passive server-to-client data delivery. More particularly, the subject application is directed to a system and method for transmitting new software upgrades or other supplemental information to an associated workstation or other network device in response to a service request submitted by the workstation or network device.

Figure 1:
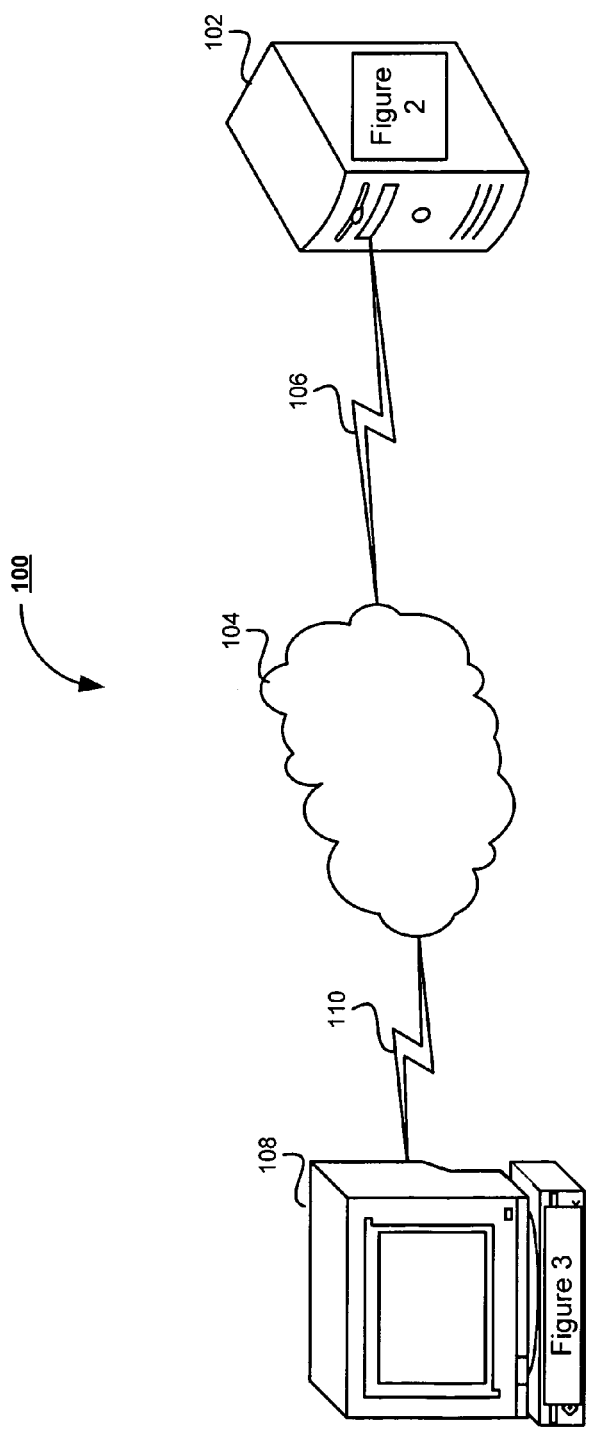
FIG. 1 which is an overall system diagram for passive server-to-client data delivery system according to the subject application.

Referring now to FIG. 1, there is shown a block diagram of a system 100 in accordance with the subject application. As shown in FIG. 1, the system 100 includes a server 102 in data communication with a distributed communications network 104 via a suitable communications link 106. It will be appreciated by those skilled in the art that the server is representative of any computer hardware employed in a server-type role in a client-server relationship. In the preferred embodiment, the server 102 is suitably adapted to provide, or host, a variety of applications and services, which are used by one or more client devices. Preferably, the server 102 is capable of providing a variety of web-based services, including, for example and without limitation, remote access, remote storage, document processing operations, print job generation, electronic mail, document management services, and the like.

The distributed communications network 104 of the system 100 is any communications network known in the art capable of enabling the exchange of data between two or more electronic devices. Preferably, the network is a distributed network, such as the Internet, wide area network, or the like. It will be appreciated by those skilled in the art that suitable networks include, for example and without limitation, a proprietary communications network, a local area network, a personal area network, an intranet, and the like. Communications between the distributed communications network 104 and the server 102 is advantageously accomplished using the communications link 106. As will be appreciated by those skilled in the art, the communications link 106 is any data exchange medium, known in the art, capable of enabling communications between two electronic devices. The communications link 106 is any suitable channel of data communications known in the art including, but not limited to wireless communications, for example and without limitation, Bluetooth, WiMax, 802.11a, 802.11b, 802.11g, 802.11(x), a proprietary communications network, infrared, optical, the public switched telephone network, or any suitable wireless data transmission system, or wired communications known in the art.

The system 100 also includes a client device, illustrated in FIG. 1 as a computer workstation 108. It will be appreciated by those skilled in the art that the client device 108 is shown in FIG. 1 as a workstation for example purposes only and any network device, known in the art, is capable of being employed in accordance with the subject application. As the skilled artisan will understand, the client device, or workstation 108, shown in FIG. 1 is representative of any computing device known in the art, including, for example and without limitation, workstation, a document processing kiosk, a personal computer, a personal data assistant, a web-enabled cellular telephone, a smart phone, or other web-enabled electronic device suitably capable of generating and/or transmitting electronic document data to a multifunctional peripheral device. In the preferred embodiment, the client device 108 is communicatively coupled to the distributed communications network 104 via a suitable communications link 110. In accordance with the subject application, the communications link 110 is any suitable communications channel known in the art including, for example and without limitation, WiMax, 802.11a, 802.11b, 802.11g, 802.11(x), Bluetooth, the public switched telephone network, a proprietary communications network, infrared, optical, or any other suitable wired or wireless data transmission communications known in the art. In the preferred embodiment of the subject application, the workstation 108 is advantageously equipped to facilitate the generation of service requests to be performed by the server 102.

Figure 2:
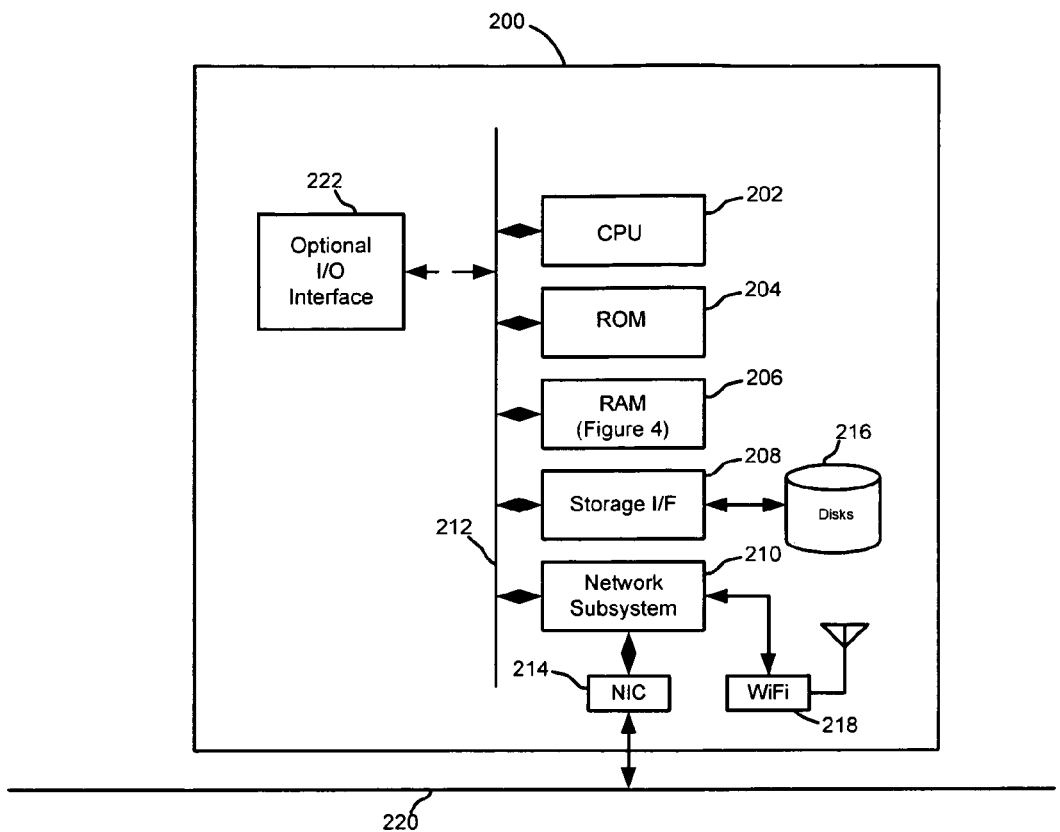
FIG. 2 is a block diagram illustrating server hardware for use in the system for passive server-to-client data delivery according to the subject application.

Turning now to FIG. 2, illustrated is a representative architecture of a suitable server 200 on which operations of the subject system are completed. Included is a processor 202, suitably comprised of a central processor unit. However, it will be appreciated that processor 202 may advantageously be composed of multiple processors working in concert with one another as will be appreciated by one of ordinary skill in the art. Also included is a non-volatile or read only memory 204 which is advantageously used for static or fixed data or instructions, such as BIOS functions, system functions, system configuration, and other routines or data used for operation of the server 200.

Also included in the server 200 is random access memory 206, suitably formed of dynamic random access memory, static random access memory, or any other suitable, addressable memory system. Random access memory provides a storage area for data instructions associated with applications and data handling accomplished by processor 202.

A storage interface 208 suitably provides a mechanism for volatile, bulk or long term storage of data associated with the server 200. The storage interface 208 suitably uses bulk storage, such as any suitable addressable or serial storage, such as a disk, optical, tape drive and the like as shown as 216, as well as any suitable storage medium as will be appreciated by one of ordinary skill in the art.

A network interface subsystem 210 suitably routes input and output from an associated network allowing the server 200 to communicate to other devices. Network interface subsystem 210 suitably interfaces with one or more connections with external devices to the server 200. By way of example, illustrated is at least one network interface card 214 for data communication with fixed or wired networks, such as Ethernet, token ring, and the like, and a wireless interface 218, suitably adapted for wireless communication via means such as WiFi, WiMax, wireless modem, cellular network, or any suitable wireless communication system. It is to be appreciated however, that the network interface subsystem suitably utilizes any physical or non-physical data transfer layer or protocol layer as will be appreciated by one of ordinary skill in the art. In the illustration, the network interface 214 is interconnected for data interchange via a physical network 220, suitably comprised of a local area network, wide area network, or a combination thereof.

Data communication between the processor 202, read only memory 204, random access memory 206, storage interface 208 and network subsystem 210 is suitably accomplished via a bus data transfer mechanism, such as illustrated by bus 212.

Suitable executable instructions on the server 200 facilitate communication with a plurality of external devices, such as workstations, document processing devices, other servers, or the like. While, in operation, a typical server operates autonomously, it is to be appreciated that direct control by a local user is sometimes desirable, and is suitably accomplished via an optional input/output interface 222 as will be appreciated by one of ordinary skill in the art.

Figure 3:
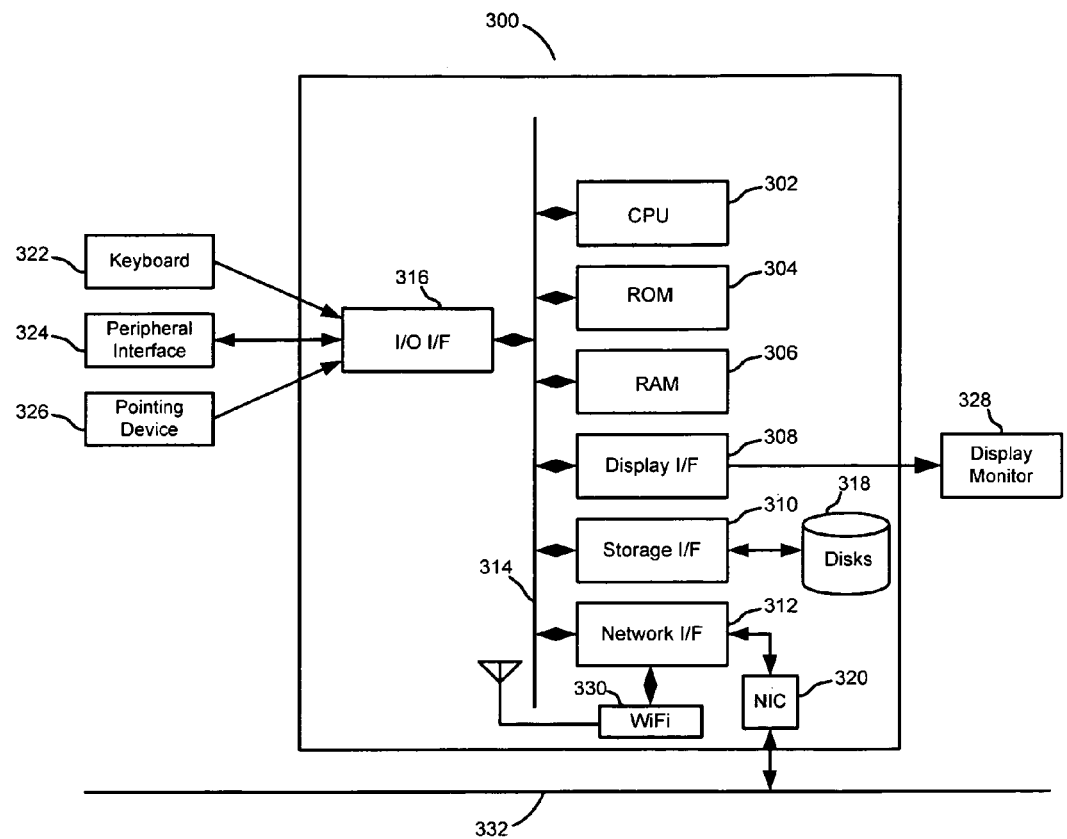
FIG. 3 is a block diagram illustrating workstation hardware for use in the system for passive server-to-client data delivery according to the subject application.

Turning now to FIG. 3, illustrated is a hardware diagram of a suitable workstation 300 for use in connection with the subject system. A suitable workstation includes a processor unit 302 which is advantageously placed in data communication with read only memory 304, suitably non-volatile read only memory, volatile read only memory or a combination thereof, random access memory 306, display interface 308, storage interface 310, and network interface 312. In a preferred embodiment, interface to the foregoing modules is suitably accomplished via a bus 314.

Read only memory 304 suitably includes firmware, such as static data or fixed instructions, such as BIOS, system functions, configuration data, and other routines used for operation of the workstation 300 via CPU 302.

Random access memory 306 provides a storage area for data and instructions associated with applications and data handling accomplished by processor 302.

Display interface 308 receives data or instructions from other components on bus 314, which data is specific to generating a display to facilitate a user interface. Display interface 308 suitably provides output to a display terminal 326, suitably a video display device such as a monitor, LCD, plasma, or any other suitable visual output device as will be appreciated by one of ordinary skill in the art.

Storage interface 310 suitably provides a mechanism for non-volatile, bulk or long term storage of data or instructions in the workstation 300. Storage interface 310 suitably uses a storage mechanism, such as storage 318, suitably comprised of a disk, tape, CD, DVD, or other relatively higher capacity addressable or serial storage medium.

Network interface 312 suitably communicates to at least one other network interface, shown as network interface 320, such as a network interface card, and wireless network interface 330, such as a WiFi wireless network card. It will be appreciated that by one of ordinary skill in the art that a suitable network interface is comprised of both physical and protocol layers and is suitably any wired system, such as Ethernet, token ring, or any other wide area or local area network communication system, or wireless system, such as WiFi, WiMax, or any other suitable wireless network system, as will be appreciated by on of ordinary skill in the art. In the illustration, the network interface 320 is interconnected for data interchange via a physical network 332, suitably comprised of a local area network, wide area network, or a combination thereof.

An input/output interface 316 in data communication with bus 314 is suitably connected with an input device 322, such as a keyboard or the like. Input/output interface 316 also suitably provides data output to a peripheral interface 324, such as a USB, universal serial bus output, SCSI, Firewire (IEEE 1394) output, or any other interface as may be appropriate for a selected application. Finally, input/output interface 316 is suitably in data communication with a pointing device interface 328 for connection with devices, such as a mouse, light pen, touch screen, or the like.

In operation, the workstation 108, such as a workstation kiosk, is in data communication with the server 102 via the network 104. A user associated with the workstation 108, inputs instructions requesting the performance of one or more services, wherein such services are provided by the server 102. The workstation 108 then generates a service request and transmits the service request to the server 102 via the network 104. Included with the service request is identifying data representing the originating workstation 108. The server 102 then receives the service request and identifies the client device 108 from which the request originated. The server 102 then determines whether or not a software upgrade or update is available for the workstation 108. When no such update is available, the server 102 performs the requested service and generates response data representing the completed service request. For example, when the service request is the generation of a print job, the server 102 receives the appropriate document data contained in the service request and performs document processing operations thereon, so as to generate a print ready data file, i.e., response data. The response data is then returned to the workstation 108 for further action, such as forwarding of the data to a document processing device (not shown) for output.

When a software upgrade or update is available, the server 102 sets a flag indicating the availability of the software upgrade. The server 102 then performs the requested service, whereupon response data is generated. The response data is then supplemented with the flag data and returns this supplemented response data to the requesting workstation 108. The workstation 108 then receives the supplemented response data and determines whether the flag indicates the availability of a software upgrade. When no such upgrade is available, the client device 108 then proceeds to finish completion of the requested service using the response data from the server 102. When an update is available, the workstation 108 finishes the requested service and initiates a new process thread, whereupon a request for the updated software is sent to the server 102. The server 102 then transmits the update to the client device 108, which thereafter installs the software, thereby updating the software on the client device 108. It will be appreciated by those skilled in the art that in the preferred embodiment, the software update is transmitted to the workstation 108 in the form of an executable, whereupon the installation of such software occurs in the background, without further user interaction.

Figure 4:
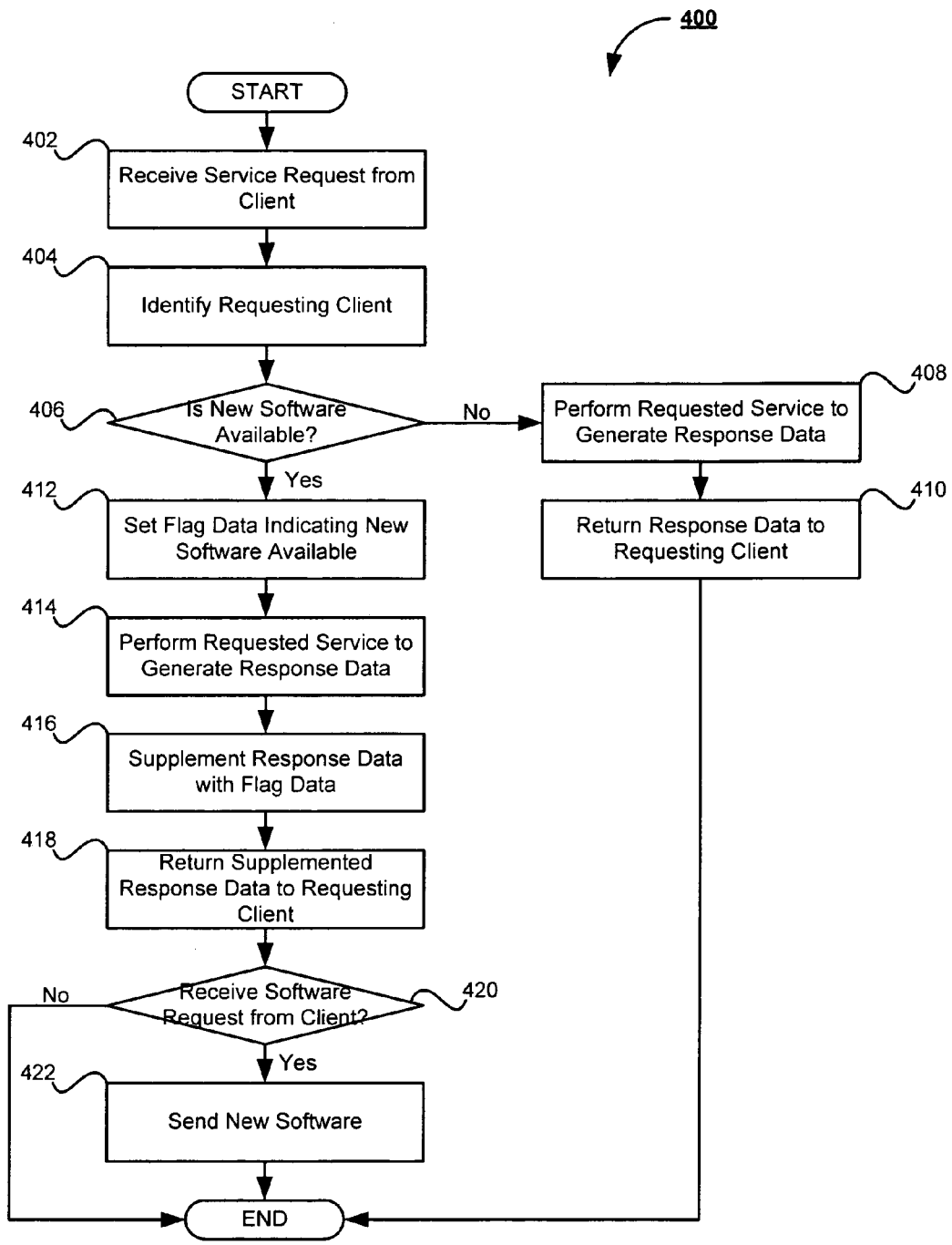
FIG. 4 is a flowchart illustrating the method for a passive server-to-client data delivery from a server point of view according to the subject application.
Figure 5:
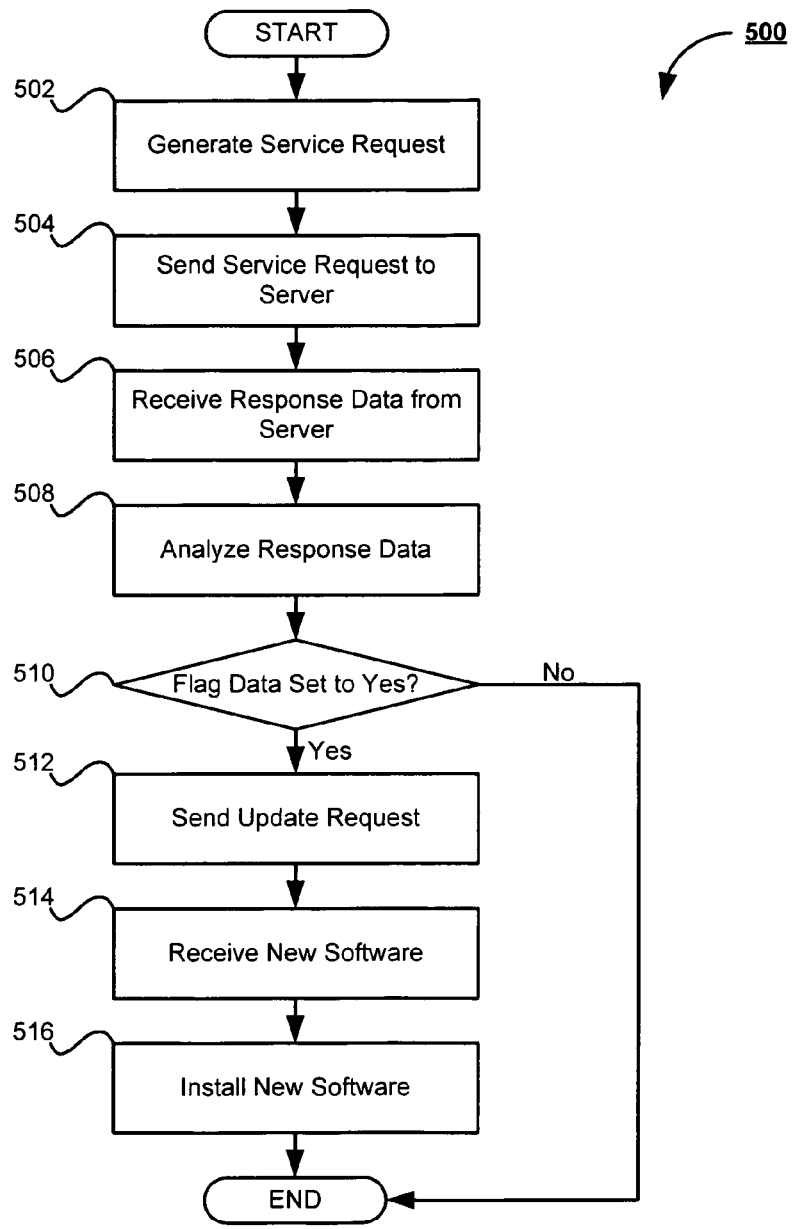
FIG. 5 is a flowchart illustrating the method for a passive server-to-client data delivery from a client point of view according to the subject application.

The foregoing system 100 and components shown in FIG. 1, FIG. 2, and FIG. 3 will better be understood when viewed in conjunction with the methods described in FIGS. 4 and 5. As shown in FIG. 4, there is illustrated a flowchart 400 depicting the server side operation of the subject application. Beginning at step 402, the server 102 receives a service request from a workstation 108. Preferably, the service request includes data representing a type of service to be performed, the identity of the requesting service, and the like. An example of a service request includes, without limitation, a request for the performance of a cost-based document processing operation, wherein the request requires the approval of the server 102 for performance. In another example, the service request includes data which requires the server 102 to approve the processing of a print job, copy job, scan job, an electronic message, a document storage operation, or the like. Following receipt of the service request, the server 102 then determines the identity of the requesting workstation 108 at step 404.

Using the identity of the workstation 108, the server 102 determines, at step 406, whether new software is available for the workstation 108. The skilled artisan will appreciate that the server 102, such as a backend management server, maintains information with respect to each workstation 108 associated with the system 100. Such information includes, for example and without limitation, operating status, installed applications and software, security information, and the like. When it is determined at step 406 that no software updates are available for the requesting workstation 108, flow proceeds to step 408, whereupon the requested service is performed and response data is generated. The response data is then returned to the client at step 410. In accordance with one aspect of the subject application, the response data returned to the client at step 410 includes flag data indicating that no software updates are available.

When the server 102 determines that one or more new software programs, updates, or upgrades are available for the requesting workstation 108, the server 102 sets a flag indicating that new software is available at step 412. The server 102 then performs the requested service at step 414, thereby generating response data. The response data is then supplemented at step 416 with the flag data indicating the presence of updated software. The supplemented software is then returned to the requesting workstation 108 at step 418. In accordance with one aspect of the subject application, the response data includes executable code, associated with the updated or new software, such that upon receipt of the supplemented response data, the code is executed by the workstation 108 upon determination by the workstation 108 of the flag data indicating such software is available. A determination is then made at step 420 whether a request has been received from the workstation 108 for the available update. When no such request has been received, the operation terminates. When the request has been received, the server 102 at step 422 transmits the software to the workstation 108. In one embodiment, the software update is in the form of an executable, such that no interaction by a user or administrator is required to implemented the update. In another embodiment, the software is transmitted to the client device 108, whereupon an administrator associated with the client device 108 then initiates the installation of the software.

Having viewed the operation of the subject application from the point of view of the server 102, attention now turns to the flowchart 500 of FIG. 5, whereupon operation of the subject application is explained from the client side of the system 100. Turning now to FIG. 5, there is shown a flowchart 500 illustrating the client side operations of the subject application. Beginning at step 502, the workstation 108 generates a service request via any suitable means. As previously discussed, the service request is capable of including, for example and without limitation, security verification, document processing services, document management services, electronic messaging services, and the like. The service request is then transmitted to the server 102 at step 504. It will be appreciated by those skilled in the art that the workstation 108 transmits the service request to the server 102 via the network 104.

At step 506, the workstation 108 receives response data from the server 102 representing the completed processing of the service request. The workstation 108 then analyzes the response data at step 508. A determination is then made at step 510, based upon the analysis of the response data, whether flag data has been set to yes, thereby indicating the availability of new software. When the flag does not indicate that new software is available, the client device 108 finishes the processing the response data and the operation terminates. When it is determined at step 510 that the flag has been set to yes, the client device 108 transmits an update request to the server 102 at step 512. Preferably, the update request includes data representative of the identity of the client device 108. The workstation 108 then receives the updated or new software at step 514. As previously discussed, the software is preferably received in the form of an executable file, such that installation at step 516 proceeds without requiring user interactions. Alternatively, the software is received by the workstation 108 and installation at step 516 occurs upon direction of an administrator associated with the workstation 108. It will be appreciated by those skilled in the art that the preferred embodiment of the subject application, the response data includes executable code, associated with the updated or new software, such that upon receipt of the supplemented response data, the code is executed by the workstation 108 upon determination by the workstation 108 of the flag data indicating such software is available.

The subject application extends to computer programs in the form of source code, object code, code intermediate sources and object code (such as in a partially compiled form), or in any other form suitable for use in the implementation of the subject application. Computer programs are suitably standalone applications, software components, scripts or plug-ins to other applications. Computer programs embedding the subject application are advantageously embodied on a carrier, being any entity or device capable of carrying the computer program: for example, a storage medium such as ROM or RAM, optical recording media such as CD-ROM or magnetic recording media such as floppy discs. The carrier is any transmissible carrier such as an electrical or optical signal conveyed by electrical or optical cable, or by radio or other means. Computer programs are suitably downloaded across the Internet from a server. Computer programs are also capable of being embedded in an integrated circuit. Any and all such embodiments containing code that will cause a computer to perform substantially the subject application principles as described, will fall within the scope of the subject application.

The foregoing description of a preferred embodiment of the subject application has been presented for purposes of illustration and description. It is not intended to be exhaustive or to limit the subject application to the precise form disclosed. Obvious modifications or variations are possible in light of the above teachings. The embodiment was chosen and described to provide the best illustration of the principles of the subject application and its practical application to thereby enable one of ordinary skill in the art to use the subject application in various embodiments and with various modifications as are suited to the particular use contemplated. All such modifications and variations are within the scope of the subject application as determined by the appended claims when interpreted in accordance with the breadth to which they are fairly, legally and equitably entitled.

What is claimed:

1. A passive server-to-client data delivery system comprising:

means adapted for receiving, via an associated network, web service request data representative of at least one selected web service request from an associated workstation of the plurality thereof, the web service request data including identification data representative of an identity of the associated workstation;

identifying means adapted for identifying the associated workstation in accordance with received identification data;

selection means adapted for selecting delivery data corresponding to updated software or data for the associated workstation;

storage means adapted for storing delivery data for installation on the associated workstation prior to receipt of the web service request;

means adapted for generating response data responsive to the web service request;

testing means adapted for testing received request data to identify delivery data targeted for the associated workstation;

means adapted for supplementing the response data responsive to received web service request data with identified delivery data targeted for the associated workstation, which delivery data is unrelated to the web service request; and means adapted for communicating output data inclusive of the response data and the delivery data to the associated workstation for use in connection with a subsequent web service request.

2. The passive server-to-client data delivery system of claim 1 further comprising:
   means adapted for receiving response data and delivery data into the associated workstation; and
   means adapted for installing received delivery data in the associated workstation.

3. The passive server-to-client data delivery system of claim 2 wherein the output data includes flag data indicative of a presence of delivery data therein.

4. The passive server-to-client data delivery system of claim 3 wherein the associated workstation is comprised of a document processing kiosk, and wherein the delivery data includes executable code adapted for operation thereof.

5. The passive server-to-client data delivery system of claim 4 wherein the associated workstation includes means adapted for commencing the executable code upon a receipt of flag data.

6. The passive server-to-client data delivery system of claim 5 wherein the executable code performs an update of software located on document processing kiosk.

7. The passive server-to-client data delivery system of claim 1 wherein the web service request includes request data for selected processing of an associated electronic document.

8. A passive server-to-client data delivery method comprising the steps of:
   storing installed software data representative of executable software previously installed relative to each of a plurality of workstations;
   receiving, via an associated network, web service request data representative of at least one selected web service request from an associated workstation of the plurality thereof, the web service request data including identification data representative of an identity of the associated workstation;
   identifying installed software on the associated workstation in accordance with received identification data;
   selecting delivery data corresponding to updated executable software or data for the associated workstation;
   storing delivery data for installation on the associated workstation prior to receipt of the web service request in accordance with an output of the selection;
   generating response data responsive to the web service request;
   testing received request data to identify delivery data targeted for the associated workstation;
   supplementing the response data responsive to received web service request data with identified delivery data targeted for the associated workstation, which delivery data is unrelated to the web service request; and
   communicating output data inclusive of the response data and the delivery data to the associated workstation for use in connection with a subsequent web service request.

9. The passive server-to-client data delivery method of claim 8 further comprising the steps of:
   receiving response data and delivery data into the associated workstation; and
   installing received delivery data in the associated workstation.

10. The passive server-to-client data delivery method of claim 9 wherein the output data includes flag data indicative of a presence of delivery data therein.

11. The passive server-to-client data delivery method of claim 8 wherein the associated workstation is comprised of a document processing kiosk, and wherein the delivery data includes executable code adapted for operation thereof.

12. The passive server-to-client data delivery method of claim 11 further comprising the step of commencing the executable code upon a receipt of flag data.

13. The passive server-to-client data delivery method of claim 12 wherein the executable code performs an update of software located on document processing kiosk.

14. The passive server-to-client data delivery method of claim 8 wherein the web service request includes request data for selected processing of an associated electronic document.

15. A computer-implemented method for passive server-to-client data delivery comprising the steps of:
   storing installed software data representative of executable software previously installed relative to each of a plurality of workstations;
   receiving, via an associated network, web service request data representative of at least one selected web service request from an associated workstation of the plurality thereof, the web service request data including identification data representative of an identity of the associated workstation;
   identifying installed software on the associated workstation in accordance with received identification data;
   selecting delivery data corresponding to updated executable software or data for the associated workstation;
   storing delivery data for installation on the associated workstation prior to receipt of the web service request in accordance with an output of the selection;
   generating response data responsive to the web service request;
   testing received request data to identify delivery data targeted for the associated workstation;
   supplementing the response data responsive to received web service request data with identified delivery data targeted for the associated workstation, which delivery data is unrelated to the web service request; and
   communicating output data inclusive of the response data and the delivery data to the associated workstation for use in connection with a subsequent web service request.

16. The computer-implemented method for passive server-to-client data delivery of claim 15 further comprising the steps of:
   receiving response data and delivery data into the associated workstation; and
   installing received delivery data in the associated workstation.

17. The computer-implemented method for passive server-to-client data delivery of claim 16 wherein the output data includes flag data indicative of a presence of delivery data therein.

18. The computer-implemented method for passive server-to-client data delivery of claim 15 wherein the associated workstation is comprised of a document processing kiosk, and wherein the delivery data includes executable code adapted for operation thereof.

19. The computer-implemented method for passive server-to-client data delivery of claim 18 further comprising the step of commencing the executable code upon a receipt of flag data.

20. The computer-implemented method for passive server-to-client data delivery of claim 19 wherein the executable code performs an update of software located on document processing kiosk.

* * * * *